US011859505B2

(12) United States Patent
Kondo et al.

(10) Patent No.: US 11,859,505 B2
(45) Date of Patent: Jan. 2, 2024

(54) STEAM TURBINE

(71) Applicant: Mitsubishi Power, Ltd., Yokohama (JP)

(72) Inventors: Makoto Kondo, Tokyo (JP); Katsuhisa Hamada, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 62 days.

(21) Appl. No.: 17/617,700

(22) PCT Filed: Aug. 18, 2020

(86) PCT No.: PCT/JP2020/031140
§ 371 (c)(1),
(2) Date: Dec. 9, 2021

(87) PCT Pub. No.: WO2021/049263
PCT Pub. Date: Mar. 18, 2021

(65) Prior Publication Data

US 2022/0235674 A1 Jul. 28, 2022

(30) Foreign Application Priority Data

Sep. 11, 2019 (JP) ................................ 2019-165348

(51) Int. Cl.
*F01D 5/24* (2006.01)
*F01D 25/24* (2006.01)
*F01D 25/28* (2006.01)
*F01D 11/24* (2006.01)
(Continued)

(52) U.S. Cl.
CPC ........... *F01D 25/243* (2013.01); *F01D 25/28* (2013.01); *F01D 11/24* (2013.01); *F01D 19/00* (2013.01);
(Continued)

(58) Field of Classification Search
CPC . F01D 5/08; F01D 5/082; F01D 25/08; F01D 25/10; F01D 11/24; F01D 25/243; F01D 25/246; F01D 25/24; F05D 2220/31
See application file for complete search history.

(56) References Cited

U.S. PATENT DOCUMENTS 7,985,045 B2 7/2011 Narita et al.
8,695,342 B2 * 4/2014 Fredriksson .............. F02C 1/05 60/648
(Continued)

FOREIGN PATENT DOCUMENTS

CN 101109297 A 1/2008
CN 103628935 A 3/2014
(Continued)

OTHER PUBLICATIONS

International Search Report dated Oct. 6, 2020, issued in counterpart Application No. PCT/JP2020/031140 with Englsih translation. (6 pages).
(Continued)

*Primary Examiner* — David E Sosnowski
*Assistant Examiner* — Maxime M Adjagbe
(74) *Attorney, Agent, or Firm* — WHDA, LLP

(57) ABSTRACT

This steam turbine is provided with: a steam turbine rotor which extends in an axial direction; a pair of bearings which support the steam turbine rotor in such a way as to be capable of rotating about the axial direction; a steam turbine casing which encloses the steam turbine rotor between the pair of bearings; a casing support unit which supports the steam turbine casing from below; and a first heating unit which is provided on the casing support unit and which is capable of heating the casing support unit.

9 Claims, 4 Drawing Sheets

(51) Int. Cl.
*F01D 19/00* (2006.01)
*F01D 25/10* (2006.01)

(52) U.S. Cl.
CPC .......... *F01D 25/10* (2013.01); *F05D 2220/31* (2013.01); *F05D 2240/14* (2013.01)

(56) References Cited

U.S. PATENT DOCUMENTS

| | | | | |
|---|---|---|---|---|
| 9,695,705 | B2 * | 7/2017 | Zheng | F01D 25/14 |
| 2008/0019821 | A1 | 1/2008 | Narita et al. | |
| 2009/0053035 | A1 | 2/2009 | Zhang et al. | |
| 2012/0128474 | A1 | 5/2012 | Roy et al. | |
| 2014/0053394 | A1 | 2/2014 | Cooper et al. | |
| 2014/0193237 | A1 | 7/2014 | Reiter et al. | |
| 2016/0123173 | A1 | 5/2016 | Zheng et al. | |
| 2019/0048741 | A1 | 2/2019 | Ishida et al. | |

FOREIGN PATENT DOCUMENTS

| | | | |
|---|---|---|---|
| CN | 205477775 | U | 8/2016 |
| CN | 206801620 | U | 12/2017 |
| CN | 109072718 | A | 12/2018 |
| DE | 102015118381 | A1 | 5/2016 |
| GB | 1145612 | A | 3/1969 |
| JP | 53-133010 | A | 10/1978 |
| JP | 53-133010 | U | 10/1978 |
| JP | 2002-285803 | A | 10/2002 |
| JP | 2008-025429 | A | 2/2008 |
| JP | 2009-052547 | A | 3/2009 |
| JP | 2012-107618 | A | 6/2012 |
| JP | 2014-040795 | A | 3/2014 |
| JP | 2014-043857 | A | 3/2014 |
| JP | 2017-172549 | A | 9/2017 |
| JP | 2018-066362 | A | 4/2018 |
| JP | 2019-090391 | A | 6/2019 |
| KR | 10-2019-0044154 | A | 4/2019 |

OTHER PUBLICATIONS

Written Opinion dated Oct. 6, 2020, issued in counterpart Application No. PCT/JP2020/031140, with English translation. (10 pages).

* cited by examiner

STEAM TURBINE

TECHNICAL FIELD

The present disclosure relates to a steam turbine.

Priority is claimed on Japanese Patent Application No. 2019-165348 filed on Sep. 11, 2019, the contents of which are incorporated herein by reference.

BACKGROUND ART

The steam turbine includes a steam turbine rotor that rotates around an axis, a pair of bearings that rotatably support both ends of the steam turbine rotor, a steam turbine casing that covers the steam turbine rotor between the bearings, and a casing support unit that supports the steam turbine casing. The steam turbine rotor has a columnar rotor body that extends along the axis, and a plurality of rotor blade stages provided on an outer peripheral surface of the rotor body. A plurality of stationary blade stages arranged so as to alternate with the rotor blade stages are provided on an inner peripheral surface of the steam turbine casing (refer to the following Patent Document 1).

Here, in order to improve the performance of the steam turbine, it is important to make the clearance small between the steam turbine rotor serving as a rotating body and the steam turbine casing serving as a stationary body, so as to reduce a loss because of steam leakage. Specifically, it is required for the clearance between the tip of each rotor blade stage and the inner peripheral surface of the steam turbine casing and for the clearance between the tip of each stationary blade stage and the outer peripheral surface of the rotor body to be as small as possible.

CITATION LIST

Patent Literature (PTL 1) Japanese Unexamined Patent Application Publication No. 2009-052547

SUMMARY OF INVENTION

Technical Problem

Meanwhile, there is a case where the steam turbine rotor and the steam turbine casing are respectively supported on a floor by separate support structures. In this case, since the magnitude of thermal extension differs between the steam turbine rotor and the steam turbine casing, there is a possibility that the rotating body and the stationary body come into contact with each other when the steam turbine is started or stopped. On the other hand, in a case where a large clearance is secured in advance to avoid the contact, the clearance during rated operation becomes excessive. Therefore, there is a possibility that the performance of the steam turbine degrades.

The present disclosure has been made to solve the above problems, and an object of the present disclosure is to provide a steam turbine having further improved performance by keeping a clearance small.

Solution to Problem

In order to solve the above problems, a steam turbine according to the present disclosure includes a steam turbine rotor that extends in a direction of an axis; a pair of bearings that rotatably support the steam turbine rotor around the axis; a steam turbine casing that surrounds the steam turbine rotor between the pair of bearings; a casing support unit that supports the steam turbine casing from below; and a first heating unit that is provided in the casing support unit and that is capable of heating the casing support unit.

A steam turbine according to the present disclosure includes a steam turbine rotor that extends in a direction of an axis; a pair of bearings that rotatably support the steam turbine rotor around the axis; a steam turbine casing that surrounds the steam turbine rotor between the pair of bearings; and a casing support unit that supports the steam turbine casing from below. The steam turbine casing has an upper half casing and a lower half casing that are joined together by combining flanges thereof with each other, and the steam turbine further includes a second heating unit that is fixed to side surfaces of the flanges of the upper half casing and the lower half casing and that is capable of heating the flanges.

Advantageous Effects of Invention

According to the present disclosure, the steam turbine having further improved performance can be provided by keeping the clearance small.

DESCRIPTION OF EMBODIMENTS

Configuration of Steam Turbine

Figure 1:
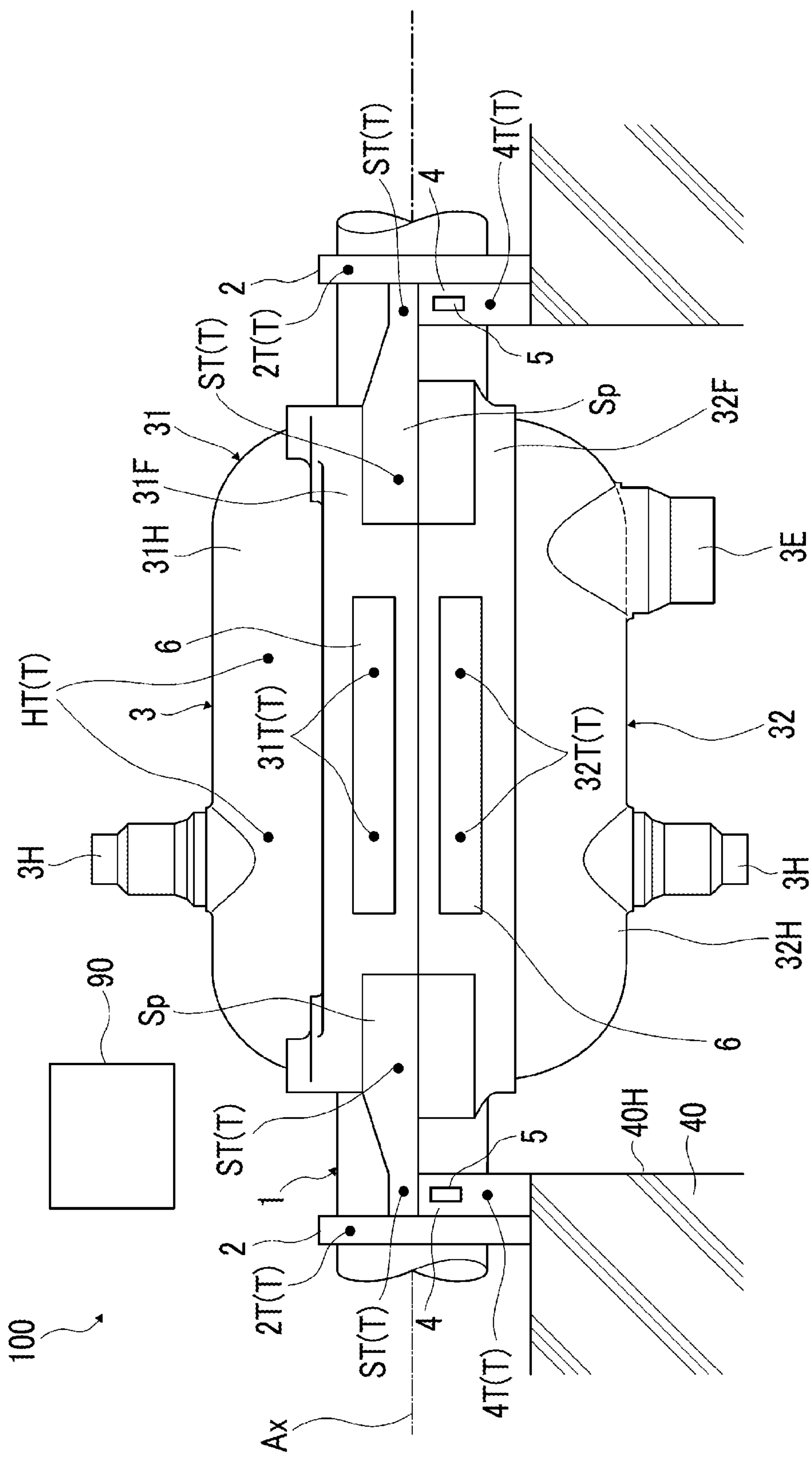
FIG. 1 is a side view showing a configuration of a steam turbine according to an embodiment of the present disclosure.
Figure 2:
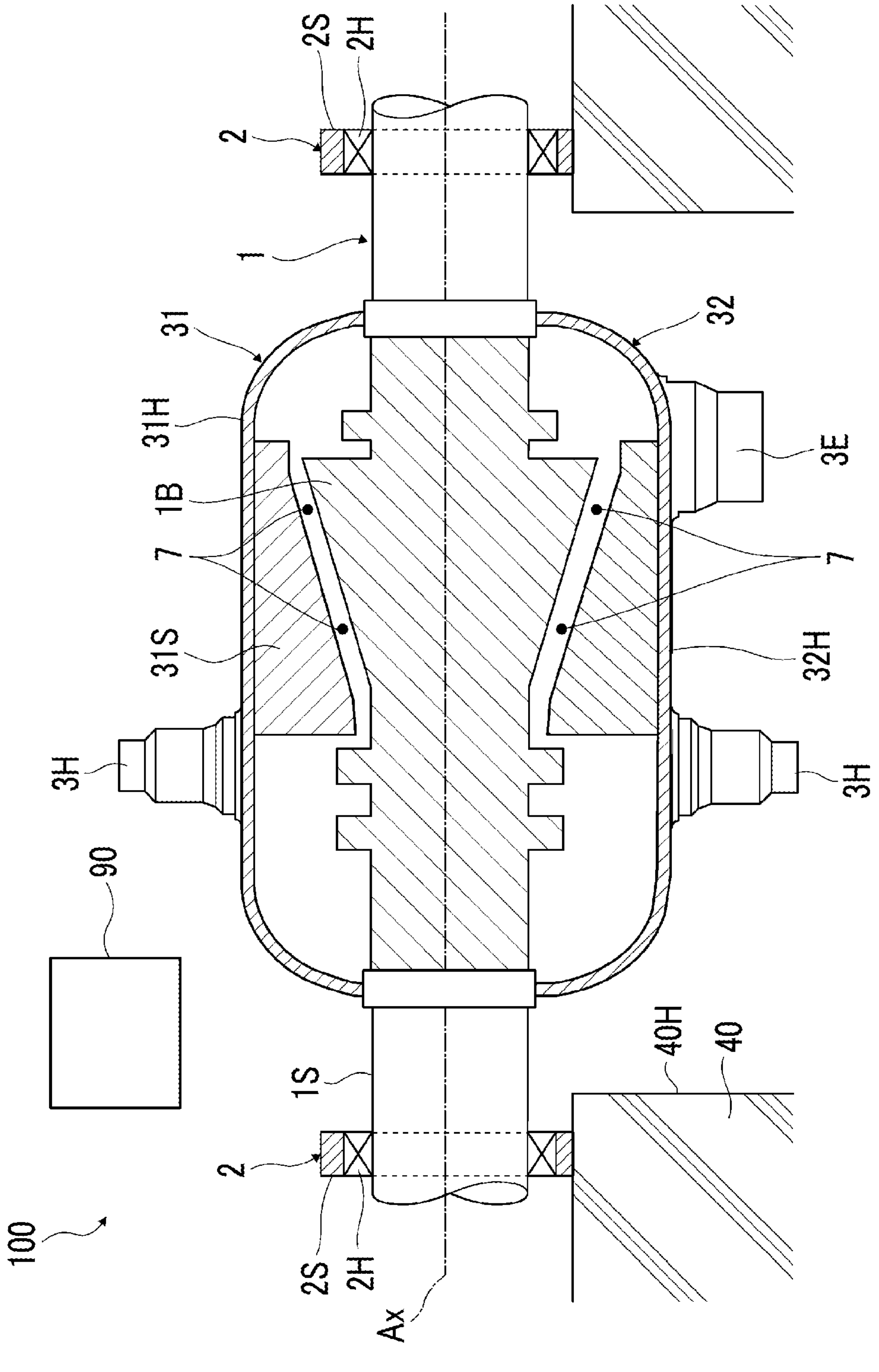
FIG. 2 is a cross-sectional view showing the configuration of the steam turbine according to the embodiment of the present disclosure and is a view showing the disposition of a steam turbine rotor.

Hereinafter, a steam turbine 100 according to an embodiment of the present disclosure will be described with reference to FIGS. 1 to 5. As shown in FIGS. 1 and 2, the steam turbine 100 includes a steam turbine rotor 1, a bearing 2, a steam turbine casing 3, a casing support unit 4, a first heating unit 5, a second heating unit 6, a temperature detection system T, a clearance detection unit 7, and a control device 90.

The steam turbine rotor 1 has a columnar shape extending in a direction of an axis Ax and is supported by a bearing 2 in a state of being rotatable around the axis Ax. As shown in FIG. 2, the steam turbine rotor 1 has a columnar rotor body 1S extending along the axis Ax and a rotor blade stage 1B provided on an outer peripheral surface of the rotor body 1S. In addition, FIG. 2 schematically shows only the outer shape of the rotor blade stage 1E. A plurality of the rotor blade stages 1B are arranged at intervals in the direction of the axis Ax on the outer peripheral surface of the rotor body 1S.

One bearing 2 is provided at each of both end portions of the steam turbine rotor 1. As shown in FIG. 2, the bearings 2 are radial bearings that support a radial load exerted by the rotor body 1S. The bearing 2 has a bearing body 2H and a bearing support member 2S that supports the bearing body 2H. An end portion of the rotor body 1S is inserted through the bearing body 2H. In addition, although not shown in detail, in addition to the bearing 2 serving as a radial bearing, it is also possible to provide a thrust bearing that supports a load in the direction of the axis Ax. Additionally, in FIG. 2, the illustration of the above-mentioned casing support unit 4 is omitted.

The steam turbine casing 3 surrounds a portion of the steam turbine rotor 1 between the bearings 2 from an outer peripheral side. The steam turbine casing 3 has an upper half casing 31 and a lower half casing 32 joined together in an up-and-down direction, and a stationary blade stage 31S. The upper half casing 31 has a semi-cylindrical shape centered on the axis Ax and has an upper half casing body 31H that opens downward and an upper half flange 31F (flange) that is integrally provided in the upper half casing body 31H. The upper half flange 31F protrudes in a plate shape from the edge of an opening portion of the upper half casing body 31H toward the outside in the horizontal plane. The upper half flange 31F is provided with a support portion Sp for supporting the upper half flange 31F on the casing support unit 4, which will be described below.

Similarly, the lower half casing 32 has a semi-cylindrical shape centered on the axis Ax and has a lower half casing body 32H that opens upward and a lower half flange 32F (flange) that is integrally provided in the lower half casing body 32H. The lower half flange 32F protrudes in a plate shape from the edge of an opening portion of the lower half casing body 32H toward the outside In the horizontal plane. The lower half flange 32F is provided with a support portion Sp for supporting the lower half flange 32F on the casing support unit 4, which will be described below.

The steam turbine casing 3 is formed by causing the upper half flange 31F and the lower half flange 32F to abut against each other from the up-and-down direction. A space that accommodates the above-mentioned steam turbine rotor 1 is formed inside the steam turbine casing 3. As shown in FIG. 2, an inner peripheral surface of the upper half casing 31 and an inner peripheral surface of the lower half casing 32 are provided with the stationary blade stage 31S that protrudes toward the inside of the space. Although not shown in detail, a plurality of the stationary blade stages 31S are arranged alternately with the rotor blade stages 1B of the steam turbine rotor 1 in the direction of the axis Ax. Additionally, the steam turbine casing 3 is provided with an intake hole 3H for guiding steam from the outside and an exhaust hole 3E for discharging steam to the outside.

The steam turbine casing 3 configured in this way is supported from below on a stand 40 by the casing support unit 4. One casing support unit 4 is provided on each side of the steam turbine casing 3 in the direction of the axis Ax. The stand 40 is formed with an opening portion 40H that is recessed downward, and most of the lower half casing 32 of the steam turbine casing 3 is buried in the opening portion 40H.

The casing support unit 4 is provided with a first heating unit 3 for heating the casing support unit 4. Specifically, as the first heating unit 5, an electric heater that generates heat because of internal resistance when an electric current is passed is suitably used.

Moreover, the above-mentioned upper half flange 31F and lower half flange 32F are each provided with a second heating unit 6. The second heating unit 6 heats the upper half flange 31F and the lower half flange 32F. The second heating unit 6 is provided on each of side surfaces (that is, surfaces facing a horizontal direction) of the upper half flange 31F and the lower half flange 32F. Specifically, as the second heating unit 6, an electric heater similar to that of the first heating unit 3 is suitably used.

The temperature detection system T that detects the temperature of each member is provided in the bearing 2, the upper half casing body 31H, the upper half flange 31F, the lower half flange 32F, the casing support unit 4, and the support portion Sp. Specifically, the temperature detection system T includes a bearing temperature detection unit 2T provided on the bearing 2 (bearing support member 2S), an upper half flange temperature detection unit 31T provided on the upper half flange 31F, a lower half flange temperature detection unit 32T provided on the lower half flange 32F, a casing temperature detection unit 4T provided in the casing support unit 4, an upper half casing temperature detection unit HT provided in the upper half casing body 31H, and a support portion temperature detection unit ST provided in the support portion. The temperature detection system T detects the temperature of an object and inputs the defection value to a control device 90 to be described below as an electric signal. That is, the temperature detection system T is electrically connected to the control device 90 by a signal line (not shown) or a wireless line.

Moreover, as shown in FIG. 2, the clearance detection unit 7 that detects the clearance between the steam turbine rotor 1 and the steam turbine casing 3 is provided in the steam turbine casing 3. More specifically, the clearance detection unit 7 detects the magnitude of the clearance between a tip of the rotor blade stage 1B and an inner peripheral surface of the steam turbine casing 3. The magnitude of the clearance detected by the clearance detection unit 7 is input to the control device 90 as an electric signal.

(Configuration of Control Device)

The control device 90 switches the operating states of the first heating unit 5 and the second heating unit 6 on the basis of the respective detection values input from the above-mentioned temperature detection system T and clearance detection unit 7. The operation of the first heating unit 5 and the second heating unit 6 can be switched between art ON state in which heating is possible by supplying an electric current and an OFF state in which heating is not possible by interrupting the electric current. The control device 90 performs switching between the ON state and the OFF state on the basis of each detection value.

Figure 3:
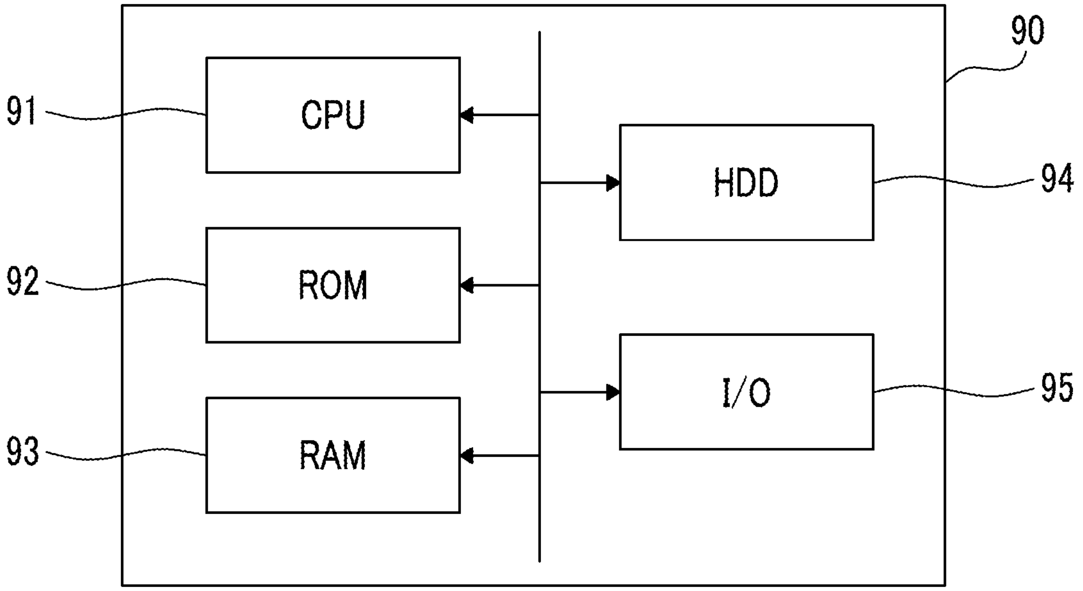
FIG. 3 is a hardware configuration diagram showing a configuration of a control device according to the embodiment of the present disclosure.
Figure 4:
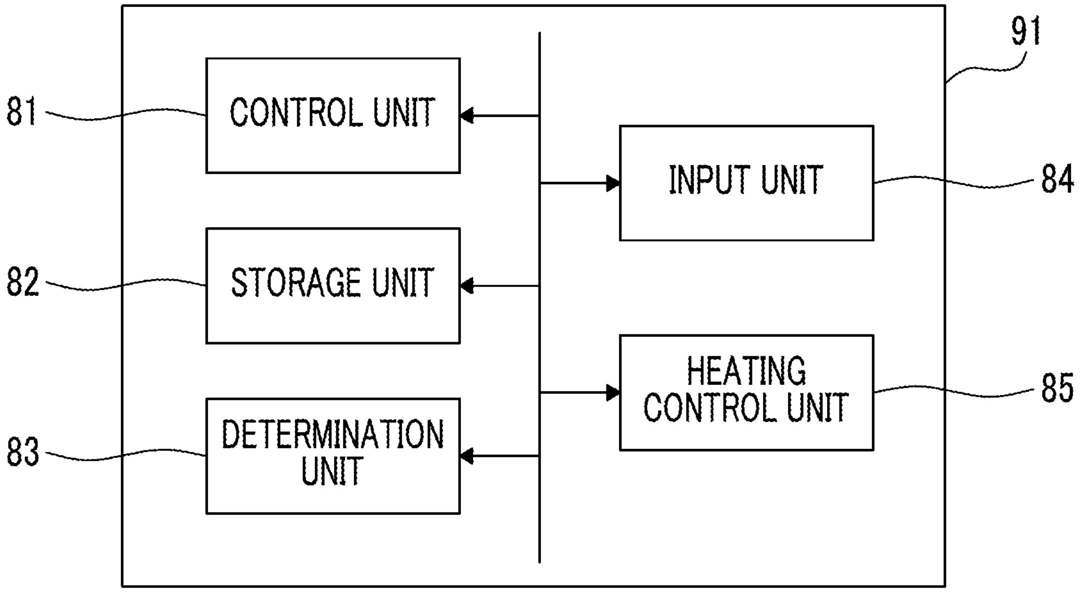
FIG. 4 is a functional block diagram showing a configuration of the control device according to the embodiment of the present disclosure.

As shown in FIG. 3, the control device 90 is a computer including a central processing unit (CPU) 91, a read only memory (ROM) 92, a random access memory (RAM) 93, a hard disk, drive (HDD) 94, and a signal receiving module 95 (I/O: Input/Output). The signal receiving module 95 receives electric signals from the temperature detection system T and the clearance detection unit 7. The signal receiving module 95 may receive an amplified signal via, for example, a charge amplifier or the like. Moreover, as shown in FIG. 4, the CPU 91 of the control device 90 functions as a control unit 81, a storage unit 82, a determination unit 83, an input unit 84, and a heating control unit 85 by executing a program stored in the CPU 91 in advance. The control unit 81 controls other functional units provided in the control device 90.

The storage unit 82 stores the target temperature of the casing support unit A when heated by the first heating unit 5. Moreover, the storage unit 82 stores the target temperatures of the upper half flange 31F and the lower half flange 32F when the flanges are heated by the second heating unit 6. In addition, the storage unit 82 stores a target value of the magnitude of the clearance between the steam turbine casing 3 and the steam turbine rotor 1.

The determination unit 83 determines the magnitude of respective detection values of the temperature detection system T and the clearance detection unit 7 that have been received via the input unit 84, and respective target values, in a case where the determination unit 83 determines that each detection value is smaller than each target value, the heating control unit 85 turns on at least one of the first heating unit 5 and the second heating unit 6. Accordingly, at least one of the casing support unit 4 and the steam turbine casing 3 is heated to cause thermal extension.

More specifically, when the casing support unit 4 is heated by the first heating unit 5, the steam turbine casing 3 expands in the up-and-down direction because of the thermal extension. When the upper half flange 31F and the lower half flange 32F are heated by the second heating unit 6, the steam turbine casing 3 expands in the direction of the axis Ax. By combining these phenomena, the clearance between the steam turbine casing 3 and the steam turbine rotor 1 is adjusted.

On the other hand, in a case where the determination unit 83 determines that each detection value is larger than each target value, the heating control unit 85 turns off at least one of the first heating unit 5 and the second heating unit 6. Accordingly, at least one of the casing support unit 4 and the steam turbine casing 3 is eliminated from the thermal extension, which has occurred so far, and contracts.

More specifically, when the heating of the casing support unit 4 by the first heating unit 5 is stopped, the steam turbine casing 3 contracts in the up-and-down direction because of the elimination of the thermal extension. When the heating of the upper half flange 31F and the lower half flange 32F by the second heating unit 6 is stopped, the steam turbine casing 3 contracts in the direction of the axis Ax. By combining these phenomena, the clearance between the steam turbine casing 3 and the steam turbine rotor 1 is adjusted.

In addition, it is desirable that the temperature detection of each part by the temperature detection system T is performed in preference to the clearance detection by the clearance detection unit 7. This is because, in general, a temperature sensor used as the temperature detection system 7 has higher durability than a non-contact type distance measuring sensor used as the clearance detection unit 7. That is, by simultaneously detecting the temperature via the temperature detection system T, the redundancy and fail-safe performance can be enhanced as compared to, for example, a case where the clearance is adjusted only by the clearance detection unit 7.

Figure 5:
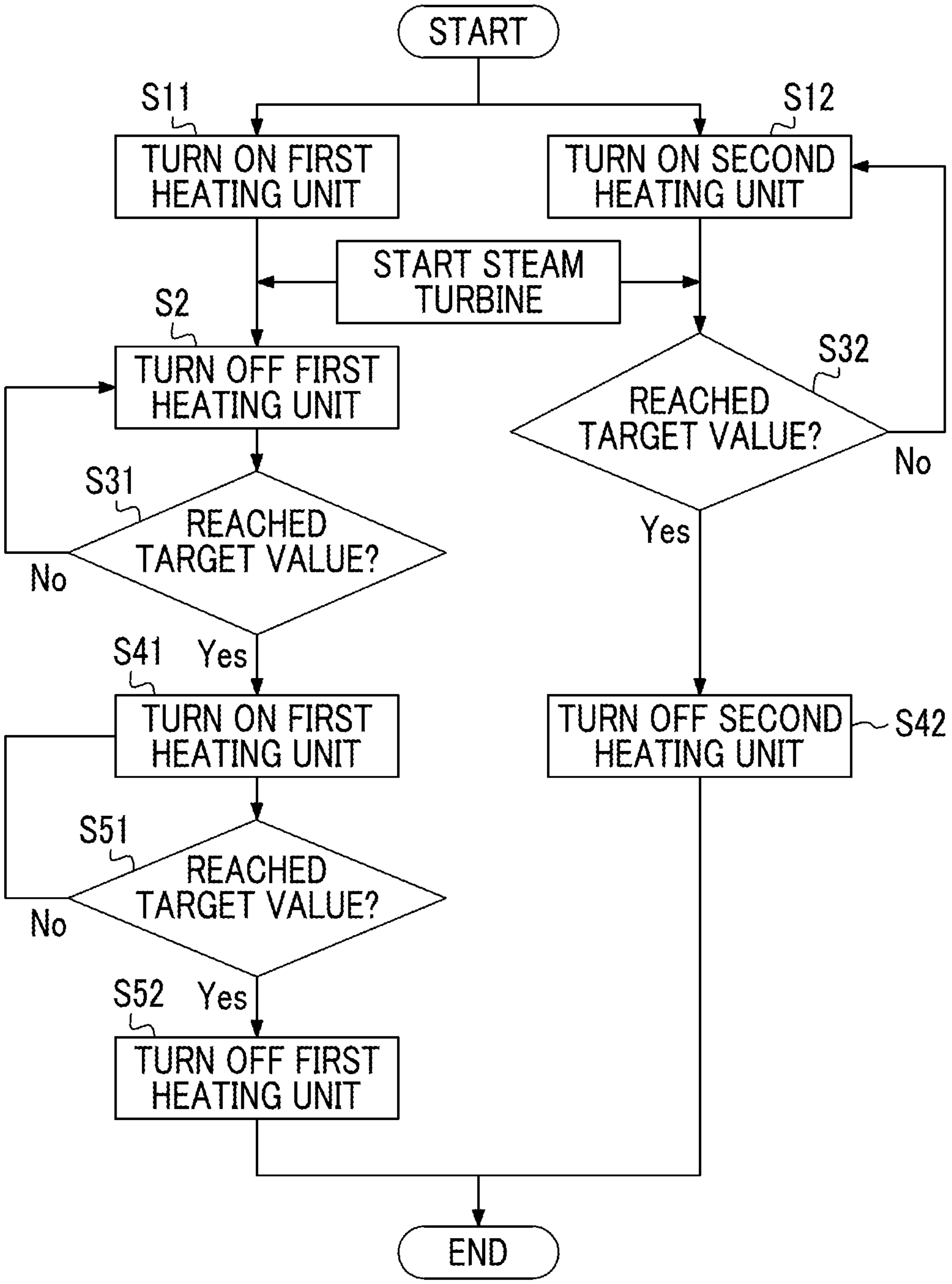
FIG. 5 is a flowchart showing a processing flow of a control device according to the embodiment of the present disclosure.

Subsequently, in the operation of the control device 90, particularly the operation when the steam turbine 100 is started will be described with reference to FIG. 5. As shown in the figure, in this control flew, the operating states of the first heating unit 5 and the second heating unit 6 are switched on the basis of the load of the steam turbine 100. First, the control device 90 turns on the first heating unit 5 and the second heating unit 6 prior to the start of the steam turbine 100 (prior to the start) (Steps S11 and S12). Accordingly, the thermal extension (expansion) occurs in the up-and-down direction and the direction of the axis Ax in the steam turbine casing 3. That is, prior to the start of the steam turbine 100, the above-mentioned clearance is increased.

After that, the steam turbine 100 is started. Simultaneously with the start cf the steam turbine 100, the control device 90 turns off the first heating unit 5 (Step S2). The second heating unit 6 maintains the ON state. Subsequently, when the detection value by the temperature detection system T or the detection value by the clearance detection unit 7 reaches a predetermined target value (temperature target value or clearance target value) (Step S31, Step S32: Yes), the control device 90 turns on the first heating unit 5 again (Step S41) and turns off the second heating unit 6 (Step S42). After that, when the detection value by the temperature detection system T or the detection value by the clearance detection unit 7 reaches a predetermined target value (temperature target value or clearance target value) again (Step S51: Yes), the control device 90 turns off the first heating unit 5 again (Step S52). Accordingly, the start of the steam turbine 100 is completed.

(Working Effects)

When the steam turbine 100 is started, the steam turbine rotor 1 is slightly displaced upward by the thermal extension earlier than the steam turbine casing 3 on the basis of a difference in thermal capacity. Because of this displacement, there is a possibility that the clearance between the steam turbine rotor 1 and the steam turbine casing 3 becomes excessively small. However, in the above configuration, the thermal extension can be caused in the steam turbine casing 3 by heating the casing support unit 4 with the first heating unit 5. Accordingly, the above clearance can be maintained.

In particular, there is a case where the thermal extension in the direction of the axis Ax occurs in the steam turbine rotor 1. According to the above configuration, even in a case where the thermal extension in the direction of the axis Ax has occurred, the thermal extension in the direction of the axis Ax can also be caused in the steam turbine casing 3 by heating the flanges (the upper half flange 31F and the lower half flange 32F) with the second heating unit 6. Accordingly, the relative position between the steam turbine rotor 1 and the steam turbine casing 3 in the direction of the axis Ax can be maintained.

Moreover, according to the above configuration, the ON state and the OFF state of the first heating unit 5 and the second heating unit 6 can be switched on the basis of the temperature of each part detected by the temperature detection system T. Accordingly, the first heating unit 5 and the second heating unit 6 can be appropriately operated depending on the operating state of the steam turbine 100.

Additionally, after the start of the steam turbine 100, first, the steam turbine rotor 1 thermally extends more than the steam turbine casing 3. Therefore, it is desirable to cause the thermal extension in the steam turbine casing 3 in advance by turning on the first heating unit 3 before the start of the steam turbine 100. Accordingly, the clearance can be maintained. On the other hand, during a certain period immediately after starting the steam turbine 100, the thermal extension of the steam turbine casing 3 may exceed the thermal extension of the steam turbine rotor 1. Therefore, by turning off the first heating unit 5 simultaneously with the start of the steam turbine 100 as in the above configuration, it is possible to suppress excessive thermal extension of the steam turbine casing 3. Moreover, when the casing temperature has changed because of the rapid inflow of high-temperature steam into the turbine casing, the steam turbine rotor 1 is in a state of having thermally extended more than the steam turbine casing 3. Therefore, as in the above configuration, when the temperature detection value or the clearance detection value has reached the target value, the first heating unit 5 can be turned on again to minimize the difference in thermal extension between the steam turbine rotor 1 and the steam turbine casing 3.

Additionally, according to the above configuration, by turning on the second heating unit 6 before the start of the steam turbine 100, the steam turbine casing 3 can be caused to thermally extend in advance in the direction of the axis Ax. Accordingly, the relative position between the steam turbine rotor 1 and the steam turbine casing 3 after the start can be maintained in the direction of the axis Ax.

Here, the magnitude of the thermal extension in the up-and-down direction occurring in the bearing 2 is proportional to the temperature of the bearing 2. According to the above configuration, by detecting the temperature of the bearing 2 with the bearing temperature detection unit 2T, it is possible to know the displacement caused by the thermal extension that has occurred in the bearing 2.

Moreover, the magnitude of the thermal extension in the up-and-down direction occurring in the casing support unit 4 is proportional to the temperature of the casing support unit 4. According to the above configuration, by detecting the temperature of the casing support, unit 4 with the casing temperature detection unit 4T, it is possible to know the displacement caused by the thermal extension that has occurred in the casing support unit 4.

In addition, the magnitude of the thermal extension in the direction of the axis Ax occurring in the steam turbine casing 3 is proportional to the temperature of the flange. According to the above configuration, by detecting the temperature of the flange with the flange temperature detection units 31T and 32T, it is possible to know the displacement because of the thermal extension in the direction of the axis Ax that has occurred in the steam turbine casing 3.

Furthermore, according to the above configuration, by switching the ON state and the OFF state of the first heating unit 5 on the basis of the magnitude of the clearance, the clearance between the steam turbine rotor 1 and the steam turbine casing 3 can be more actively optimized.

Other Embodiments

The embodiment of the present disclosure has been described in detail above with reference to the drawings. However, the specific configuration is not limited to the embodiment, and includes design changes or the like without departing from the gist of the present disclosure.

<Additional Notes>

The steam turbines described in the respective embodiments are understood as follows, for example.

(1) A steam turbine 100 according to a first, aspect includes a steam turbine rotor 1 that extends in a direction of an axis Ax, a pair of bearings 2 that rotatably support the steam turbine rotor 1 around the axis Ax, a steam turbine casing 3 that surrounds the steam turbine rotor 1 between the pair of bearings 2, a casing support unit 4 that supports the steam turbine casing 3 from below, and a first heating unit 5 that is provided in the casing support unit 4 and that is capable of heating the casing support unit 4.

When the steam turbine 100 is started, the steam turbine rotor 1 is slightly displaced upward by the thermal extension earlier than the steam turbine casing 3 on the basis of a difference in thermal capacity. Because of this displacement, there is a possibility that the clearance between the steam turbine rotor 1 and the steam turbine casing 3 becomes excessively small. However, in the above configuration, the thermal extension can be caused in the steam turbine casing 3 by heating the casing support unit 4 with the first heating unit 5. Accordingly, the above clearance can be maintained.

(2) In the steam turbine 100 according to a second aspect, the steam turbine casing 3 has an upper half casing 31 and a lower half casing 32 that are joined together by combining flanges 31F and 32F thereof with each other, and the steam turbine further includes a second heating unit 6 that is fixed to side surfaces of the flanges 31F and 32F of the upper half casing 31 and the lower half casing 32 and that is capable of heating the flanges 31F and 32F.

When the steam turbine 100 is started, the steam turbine rotor 1 thermally extends earlier than the steam turbine casing 3 on the basis of the difference in thermal capacity. In particular, there is a case where the thermal extension in the direction of the axis Ax occurs in the steam turbine rotor 1. According no the above configuration, even in a case where the thermal extension in the direction of the axis Ax has occurred, the thermal extension in the direction of the axis Ax can also be caused in the steam turbine casing 3 by heating the flanges 31F and 32F with the second heating unit 6. Accordingly, the relative position between the steam turbine rotor 1 and the steam turbine casing 3 in the direction of the axis Ax can be maintained.

(3) The steam turbine 100 according to a third aspect further includes a temperature detection system T that detects the temperature of at least one of the bearing 2, the flanges 31F and 32F, and the casing support unit 4, and a control device 90 that performs switching between an ON state and an OFF state of the first heating unit 5 and the second heating unit 6 on the basis of a detection result of the temperature detection system T.

According to the above configuration, the ON state and the OFF state of the first heating unit 5 and the second heating unit 6 can be switched on the basis of the temperature of each part detected by the temperature detection system T. Accordingly, the first heating unit 5 and the second heating unit 6 can be appropriately operated depending on the operating state of the steam turbine 100.

(4) In the steam turbine 100 according to a fourth aspect, the control device 90 turns on the first heating unit 5 before the start of the steam turbine 100, turns off the first heating unit 5 when the steam turbine 100 is started, and turns on the first heating unit 5 again when the detection result of the temperature detection system T has reached a predetermined target value.

After the start of the steam turbine 100, first, the steam turbine rotor 1 thermally extends more than the steam turbine casing 3. Therefore, it is desirable to cause the thermal extension in the steam turbine casing 3 in advance by turning on the first heating unit 5 before the start of the steam turbine 100. Accordingly, the clearance can be maintained. On the other hand, during a certain period immediately after starting the steam turbine 100, the thermal extension of the steam turbine casing 3 may exceed the thermal extension of the steam turbine rotor 1. Therefore, by turning off the first heating unit 5 when the steam turbine 100 is started as in the above configuration, it is possible to suppress excessive thermal extension of the steam turbine casing 3. Moreover, when the detection result of the temperature detection system T has reached the predetermined target value, the steam turbine rotor 1 is in a state of having thermally extended more than the steam turbine casing 3. Therefore, as in the above configuration, when the load of the steam turbine 100 has reached 100%, the first heating unit 5 can be turned on again to minimize the difference in thermal extension between the steam turbine rotor 1 and the steam turbine casing 3.

(5) In the steam turbine 100 according to a fifth aspect, the control device 90 turns on the second heating unit 6 before the start of the steam turbine 100 to cause the steam turbine casing 3 to thermally extend in advance in the direction of the axis Ax.

According to the above configuration, by turning on the second heating unit 6 before the start of the steam turbine 100, the steam turbine casing 3 can be caused to thermally extend in advance in the direction of the axis Ax. Accordingly, the relative position between the steam turbine rotor 1 and the steam turbine casing 3 after the start can be maintained in the direction of the axis Ax.

(6) In the steam turbine 100 according to a sixth aspect, the temperature detection system T has a bearing temperature detection unit 2T that detects the temperature of the bearing 2.

The magnitude of the thermal extension in the up-and-down direction occurring in the bearing 2 is proportional to the temperature of the bearing 2. According to the above configuration, by detecting the temperature of the bearing 2 with the bearing temperature detection unit 2T, it is possible to know the displacement caused by the thermal extension that has occurred in the bearing 2.

(7) In the steam turbine 100 according to a seventh aspect, the temperature detection system T has a casing temperature detection unit 4T that detects the temperature of the casing support unit 4.

The magnitude of the thermal extension in the up-and-down direction occurring in the casing support unit 4 is proportional to the temperature of the casing support unit 4. According to the above configuration, by detecting the temperature of the casing support unit 4 with the casing temperature detection unit 4T, it is possible to know the displacement caused by the thermal extension that has occurred in the casing support unit 4.

(8) In the steam turbine 100 according to an eighth aspect, the temperature detection system T has flange temperature detection units 31T and 32T that detect, the temperatures of the flanges 31F and 32F.

The magnitude of the thermal extension in the direction of the axis Ax occurring in the steam turbine casing 3 is proportional to the temperatures of the flanges 31F and 32F. According to the above configuration, by detecting the temperatures of the flanges 31F and 32F with the flange temperature detection units 31T and 32T, it is possible to know the displacement caused by the thermal extension in the direction of the axis Ax that has occurred in the steam turbine casing 3.

(9) The steam turbine 100 according to a ninth aspect further includes a clearance detection unit 7 that detects a clearance between the steam turbine rotor 1 and the steam turbine casing 3, and the control device 90 performs switching between an ON state and an OFF state of the first heating unit 5 when the clearance detected by the clearance detection unit 7 has reached a predetermined clearance target value.

According to the above configuration, by switching the ON state and the OFF state of the first heating unit 5 on the basis of the magnitude of the clearance, the clearance between the steam turbine rotor 1 and the steam turbine casing 3 can be more actively optimized.

(10) A steam turbine 100 according to a tenth aspect includes a steam turbine rotor 1 that extends in a direction of an axis Ax, a pair of bearings 2 that rotatably support the steam, turbine rotor 1 around the axis Ax, a steam turbine casing 3 that surrounds the steam turbine rotor 1 between the pair of bearings 2, and a casing support unit. A that supports the steam turbine casing 3 from below, and the steam turbine casing 3 has an upper half casing 31 and a lower half casing 32 that are joined together by combining flanges 31F and 32F thereof with each other, and the steam turbine further includes a second heating unit 6 that is fixed to side surfaces of the flanges 31F and 32F of the upper half casing 31 and the lower half casing 32 and that is capable of heating the flanges 31F and 32F.

When the steam turbine 100 is started, the steam turbine rotor 1 thermally extends earlier than the steam turbine casing 3 on the basis of the difference in thermal capacity. In particular, there is a case where the thermal extension in the direction of the axis Ax occurs in the steam turbine rotor 1. According to the above configuration, even in a case where the thermal extension in the direction of the axis Ax has occurred, the thermal extension in the direction of the axis Ax can also be caused in the steam turbine casing 3 by heating the flanges 31F and 32F with the second heating unit 6. Accordingly, the relative position between the steam turbine rotor 1 and the steam turbine casing 3 in the direction of the axis Ax can be maintained.

REFERENCE SIGNS LIST

100 steam turbine
1 steam turbine rotor
1B rotor blade stage
1S rotor body
2 bearing
2H bearing body
2S bearing support member
3 steam turbine casing
3E exhaust hole
3H intake hole
31 upper half casing
32F upper half flange
31H upper half casing body
31S stationary blade stage
32 lower half casing
32F lower half flange
32H lower half casing body
31T upper half flange temperature detection unit
32T lower half flange temperature detection unit
4 casing support unit
4T casing temperature detection unit
5 first heating unit
6 second heating unit
7 clearance detection unit
81 control unit
82 storage unit
83 determination unit
84 input unit
85 heat control unit
90 control device
91 CPU
92 ROM
93 RAM
94 HDD
95 signal receiving module (I/O)

The invention claimed is:

1. A steam turbine comprising:

a steam turbine rotor that extends in a direction of an axis;

a pair of bearings that rotatably support the steam turbine rotor around the axis;

a steam turbine casing that surrounds the steam turbine rotor between the pair of bearings;

a casing support unit that supports the steam turbine casing from below and that is provided on each side of the steam turbine casing in the direction of the axis; and a first heating unit that is provided in each casing support unit and that is capable of heating the casing support unit, wherein the first heating unit is turned on before start of the steam turbine, and the first heating unit is turned off when the steam turbine is started.

2. The steam turbine according to claim 1, wherein the steam turbine casing has an upper half casing and a lower half casing that are joined together by combining flanges thereof with each other, and the steam turbine further comprises a second heating unit that is fixed to side surfaces of the flanges of the upper half casing and the lower half casing and that is capable of heating the flanges.

3. The steam turbine according to claim 2, further comprising:

a temperature detection system that detects a temperature of at least one of the bearing, the flanges, and the casing support unit; and a control device that performs switching between an ON state and an OFF state of the first heating unit and the second heating unit on the basis of a detection result of the temperature detection system.

4. The steam turbine according to claim 3, wherein the control device turns on the first heating unit before start of the steam turbine, turns off the first heating unit when the steam turbine is started, and turns on the first heating unit again when the detection result of the temperature detection system has reached a predetermined target value.

5. The steam turbine according to claim 3, wherein the control device turns on the second heating unit before start of the steam turbine to cause the steam turbine casing to thermally extend in advance in the direction of the axis.

6. The steam turbine according to claim 3, wherein the temperature detection system has a bearing temperature detection unit that detects a temperature of the bearing.

7. The steam turbine according to claim 3, wherein the temperature detection system has a casing temperature detection unit that detects a temperature of the casing support unit.

8. The steam turbine according to claim 3, wherein the temperature detection system has a flange temperature detection unit that detects temperatures of the flanges.

9. The steam turbine according to claim 3, further comprising:

a clearance detection unit that detects a clearance between the steam turbine rotor and the steam turbine casing, wherein the control device performs switching between an ON state and an OFF state of the first heating unit when the clearance detected by the clearance detection unit has reached a predetermined clearance target value.

* * * * *